Sept. 17, 1935.  G. A. JULIUS ET AL  2,014,572
INTEGRATING MECHANISM FOR TOTALIZATORS
Filed Aug. 3, 1932    6 Sheets-Sheet 3

Sept. 17, 1935.   G. A. JULIUS ET AL   2,014,572
INTEGRATING MECHANISM FOR TOTALIZATORS
Filed Aug. 3, 1932   6 Sheets-Sheet 4

Patented Sept. 17, 1935

2,014,572

UNITED STATES PATENT OFFICE 2,014,572

INTEGRATING MECHANISM FOR TOTALIZATORS

George Alfred Julius and Awdry Francis Julius, Sydney, New South Wales, Australia Application August 3, 1932, Serial No. 627,369
In Australia August 19, 1931

2 Claims. (Cl. 235—92)

This invention relates to one unit of a totalizator assembly which is built up on an inter-connected individual unit system. In such an assembly the first unit is a group of ticket issuing machines of which any number required to cope with the business in prospect is provided. These ticket issuing machines individually transmit their registrations of tickets for each horse to an escapement in the second unit. This second unit is a group of integrating mechanisms. One of these integrators sums up the grand total of all the registrations on the ticket machines, and the other integrators in the group respectively sum up the individual horse totals. Such an integrating mechanism is the subject of the present application.

The third unit is a gear box which is connected up to the grand total integrator above-mentioned. In this gear box certain deductions are made from the grand total, and the remaining total is proportioned according to the required dividend system on which the betting is being conducted. This unit is the subject of our co-pending United States application Serial No. 627,371 filed August 3, 1932. The summation of the movements in the gear box is applied to a grand total indicator and also to the shaft of a master self-synchronizing motor. This motor is wired in series with a plurality of distant self-synchronizing motors, each of which respectively operates a distant grand total indicator.

The fourth unit is a group of ratio or odds computing and indicating devices in which the ratio of the adjusted grand total in relation to the respective horse totals is transformed into a mechanical movement and displayed as "odds". Each computer is connected up to one of the horse total integrators above-mentioned, and all of them are connected up to the grand total gear box above-mentioned. This unit is the subject of our co-pending United States application No. 627,370 filed August 3, 1932.

The fifth unit of the series comprises a control station from which a plurality of distant indicators is operated. This unit is the subject of our co-pending United States application Serial No. 627,371 filed August 3, 1932.

One of the objects of the invention is to provide an efficient totalizator apparatus which is constructed in interchangeable units of moderate dimensions, adapted for rapid removal and re-erection, and adapted for interconnection with facility to form together a complete assembly, and also adapted for adjustment without mechanical change to vary their capacity and thus make them usable with equal advantage for either a small volume of business or a large volume of business.

Hitherto totalizators of the type to which this invention belongs have consisted in effect of a number of ticket issuing machines connected up to a ponderous assembly of mechanism which was of such a character that when once erected it had to remain as a permanent installation. For this reason it was impracticable to provide an efficient totalizator for courses which call for its use only at long intervals and for short periods.

The integrating mechanism which is the subject of the present application is illustrated in the accompanying drawings, in which:—

Figure 1:
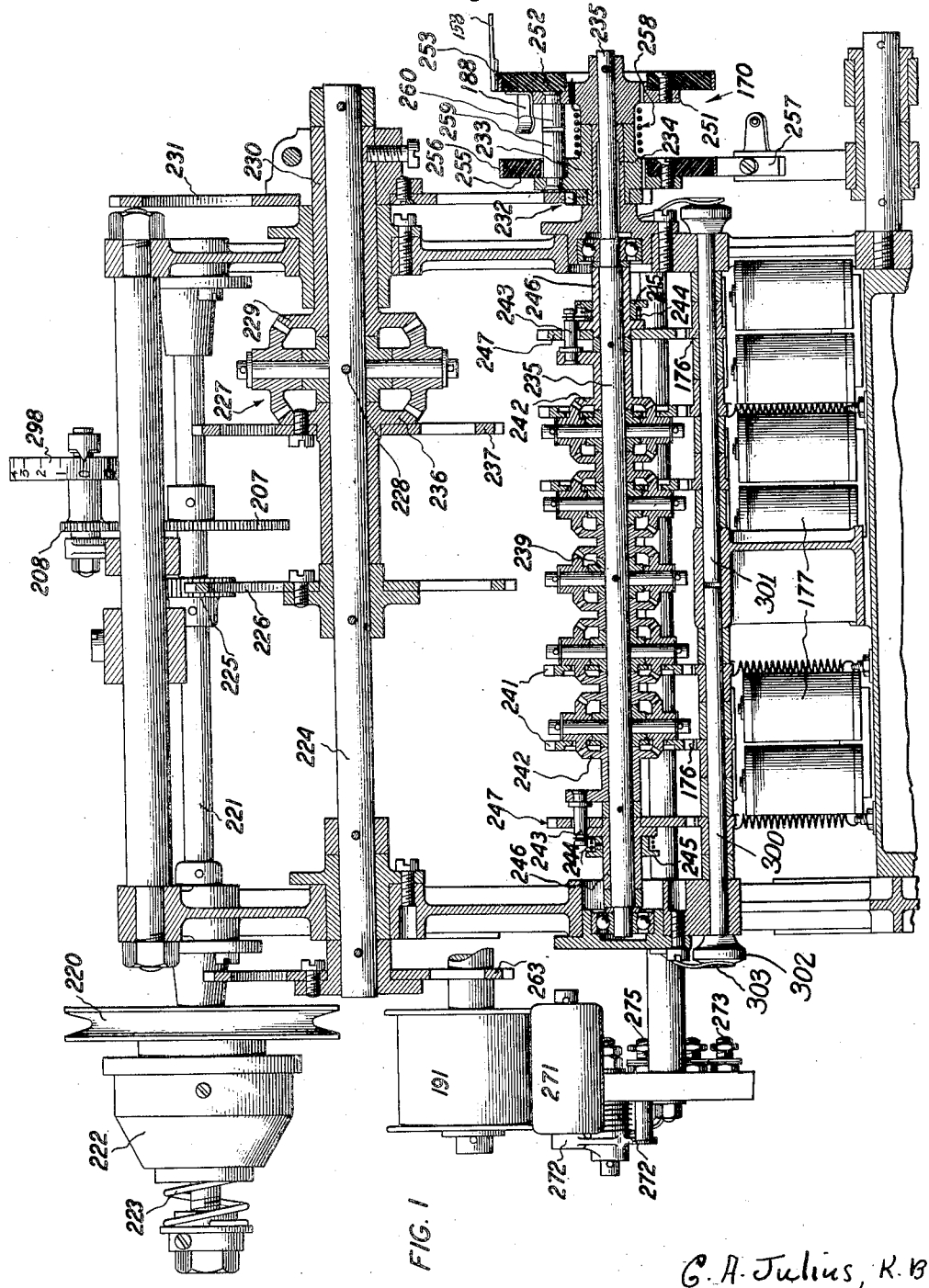
Fig. 1 is a vertical sectional elevation, and Fig. 2 a plan view of one horse total integrator. In each of these figures certain parts are omitted to simplify the drawings.

Initial drive is transmitted from a constantly running motor to each integrator through a belt pulley 220 which is connected to a shaft 221 through a slipping clutch 222, 223 being the clutch spring. The main summation shaft 224 is driven from the shaft 221 through a pinion 225 which meshes with a spur wheel 226, the spur wheel 226 being keyed to the shaft 224. The rotation of the shaft 224 is permissive and is controlled through an epicyclic box 27, the planet element of which is keyed at 228 to the shaft 224. The sun wheel 229 of the epicyclic box 227 carries on its sleeve 230 a spur wheel 231 which meshes with a pinion 232 fixed to a sleeve 233 (Fig. 1) which is rotatable about an inner sleeve 234 on the outer end of a secondary summation shaft 235. Drive is transmitted from the sleeve 233 to the shaft 235 through a coupling 170 which will be hereinafter described. The other sun wheel 236 (Fig. 2) is geared through spur wheels 237—172 and a coupling 173 to another summation shaft 174 which carries a train of epicyclic boxes 175. The registrations received from the ticket issuing machines are put through escapements on the epicyclic boxes on the shaft 235—174, and are totalled on the main summation shaft 224. The rotations of the shaft 224 are therefore the sum of the rotations of the shafts 235 and 174. The paralleling of the shafts 235 and 174 enables the building of the unit compactly when a large number of issuing machines are required to be operatively associated with it.

Figure 7:
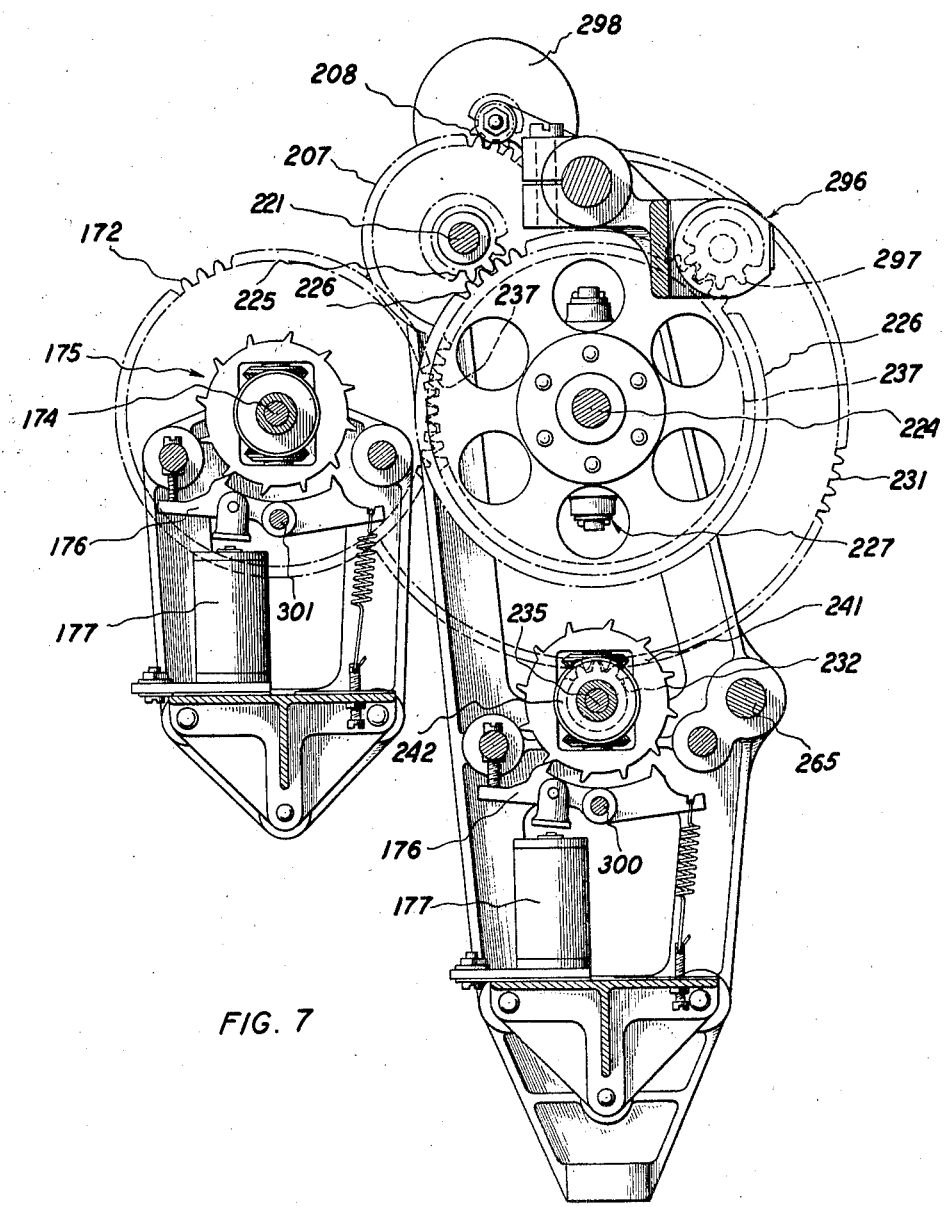
Fig. 7 is a sectional elevation on the plane of the line 5—5 in Fig. 2.
Figure 8:
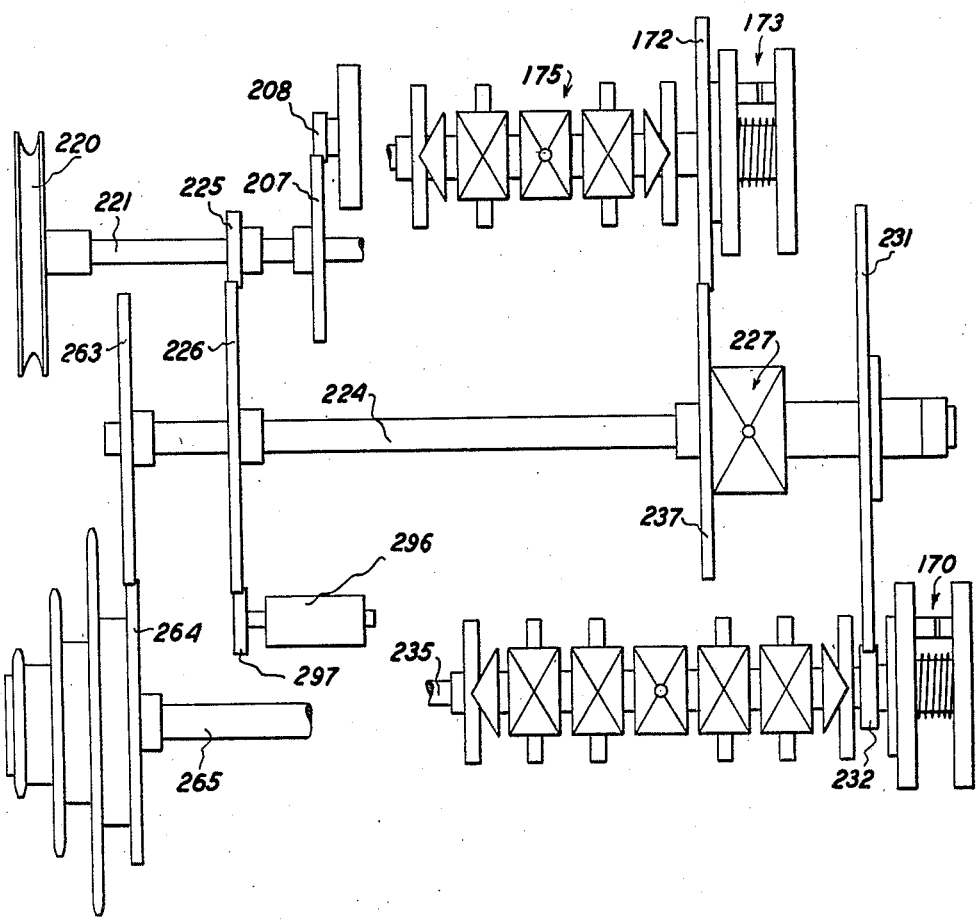
Fig. 8 is a diagram of the gearing.

The torsion applied by the motor to the shaft 221 is transmitted through the spur wheels 225—226 to the main summation shaft 224 and thence through the epicyclic box 227 to the shafts 235 and 174. The shafts 235—174 can turn permissively only when released through the operation of escapements such as 176 which are respectively controlled by the ticket issuing machines through electro-magnets such as 177 (see Figs. 1 and 7). The consequence is that the shaft 221 is under constant torsion, the clutch 222 slipping while the shaft is held against rotation, but immediately release of any of the escapements takes place the clutch drive becomes effective and motion is transmitted through the system.

The escapements 176 are rotatably mounted on spindles which are carried in bearings on the main frame. A convenient arrangement is shown in Fig. 1 in which the spindles 300—301 are fitted with a head 302 and held in position by a spring finger 303. This arrangement facilitates rapid removal and replacement of the escapements 176.

It has been found in practice that when a long train of epicyclic boxes is fitted on one shaft, the internal friction, the lag, and the lost motion cause inaccuracies in the final movement, and it is to remedy this difficulty that a plurality of shafts 235—174 is provided, whereby it is made possible to multiply the number of epicyclic boxes through which motions can be communicated through the apparatus. In the arrangement shown in Fig. 1, the rotor 239 in the epicyclic box in the mid position in the group is keyed to the shaft 235 and the respective control electro-magnets 177 operate the escapements 176 which coact with the escapement wheels 241 on the respective planet rotors of the other boxes in the train. The sun wheels 242 at the respective ends of the train are not locked to the shaft; their hubs are extended and flanged and each is fitted with an offset pin 243 which projects through a slot in an escapement wheel 241. The pin 243 is connected by a coiled spring 244 to a drum 245 which is fast on a sleeve 246, this sleeve being rotatable on the shaft 235 and fixed to the escapement wheel 241. The spring 244 being under tension will apply rotative movement to the escapement wheel 241, and cause it to move quickly ahead one tooth at a time when it is released by its magnet 177, notwithstanding that there is lag in the epicyclic train. The capacity of the spring 244 is sufficient to cause the escapement wheel 241 to move one or more tooth spaces ahead of the pin 243. As the epicyclic train ultimately comes up to its normal position, the spring 244 rewinds automatically and the escapement wheel 241 is therefore always under approximately uniform tension.

The drive from the shaft 224 to the shaft 174 is through the coupling 173 which is carried on the end of the shaft 174. This coupling is identical in construction and operation with the coupling 170 between the shaft 224 and the shaft 235. One of these couplings (173) is shown in plan view in Fig. 2, and the other (170) is shown in sectional elevation in Fig. 1, and the same reference numerals have been used to indicate corresponding parts in each case.

The shaft 235 has pinned on one end of it a flange 251 which is fitted with a disc 252 of insulating material and this disc is shod peripherally with a metal band 253 with which a brush 187 coacts. A contact finger 188 is also fixed on the side of the insulating disc 252 in electrical communication with the peripheral band 253 thereon. The sleeve 233 is similarly fitted with a disc 255 of insulating material and this disc is similarly shod on its periphery with a metal band 256 with which a brush 257 coacts. The disc 255 is also fitted with a contact finger 189. The sleeve 233 is connected to the flange 251 by a coiled spring 258. The torsion transmitted through the sun wheel 229 and the spur train 231—232 tends to turn the sleeve 233, but this movement is restrained by a check 259 which normally engages against a corresponding check 260 on the inner side of the flange 251. Until the shaft 235 is permitted to rotate, the sleeve 233 is held against rotation by the checks 259—260. When, however, the shaft 235 is liberated by a movement of one or more of the escapements which it carries, the tension on the spring 258 is sufficient to turn the disc 252 and the shaft 235 even though the drive check 260 is not instantly followed up by the drive check 259. So long as the clutch 222 functions, and also so long as the epicyclic train does not move at excessive speed, there should always be pressure between the checks 259—260, tending to drive the shaft 235, but in the event of any lag by the member 233, the spring 258 ensures an immediate responsive movement of the shaft 235 and permits an advance movement of that shaft in relation to the sleeve 233. This overrunning movement is taken up when the drive from the pulley 220 causes the check 259 to move up to its normal position again to contact with the check 260 (see Fig. 2). When registrations are being put through the issuing machines at a very fast rate so that the shaft 235 is permitted to turn at a very fast rate, then the disc 252 may overrun the sleeve 233 but the spring 258 has sufficient capacity to take care of a nearly complete rotation of the disc 252 in advance of the disc 255. A similar overrun control (173) is provided for the shaft 174. If through any fault in the driving mechanism or excessive speed in the operation of the escapements 176 the advance movement of either of the discs 252 in relation to the associated disc 255 should exceed about 350°, then the contact 188 will engage the contact 189 and short circuit a relay 190 (see Fig. 6), with the result that the circuit through all the electro-magnets 177 connected with this particular integrator and through the corresponding contacts in the ticket issuing machines will be cut out. The integrator then will become dead and all other apparatus in the system relating to the particular horse to which the integrator has been allocated, will be cut out so that no more tickets can be issued on that horse until the fault has been rectified. Simultaneously, this condition is signalled to an operator by the lighting up of an alarm lamp and/or by an audible signal.

Figure 6:
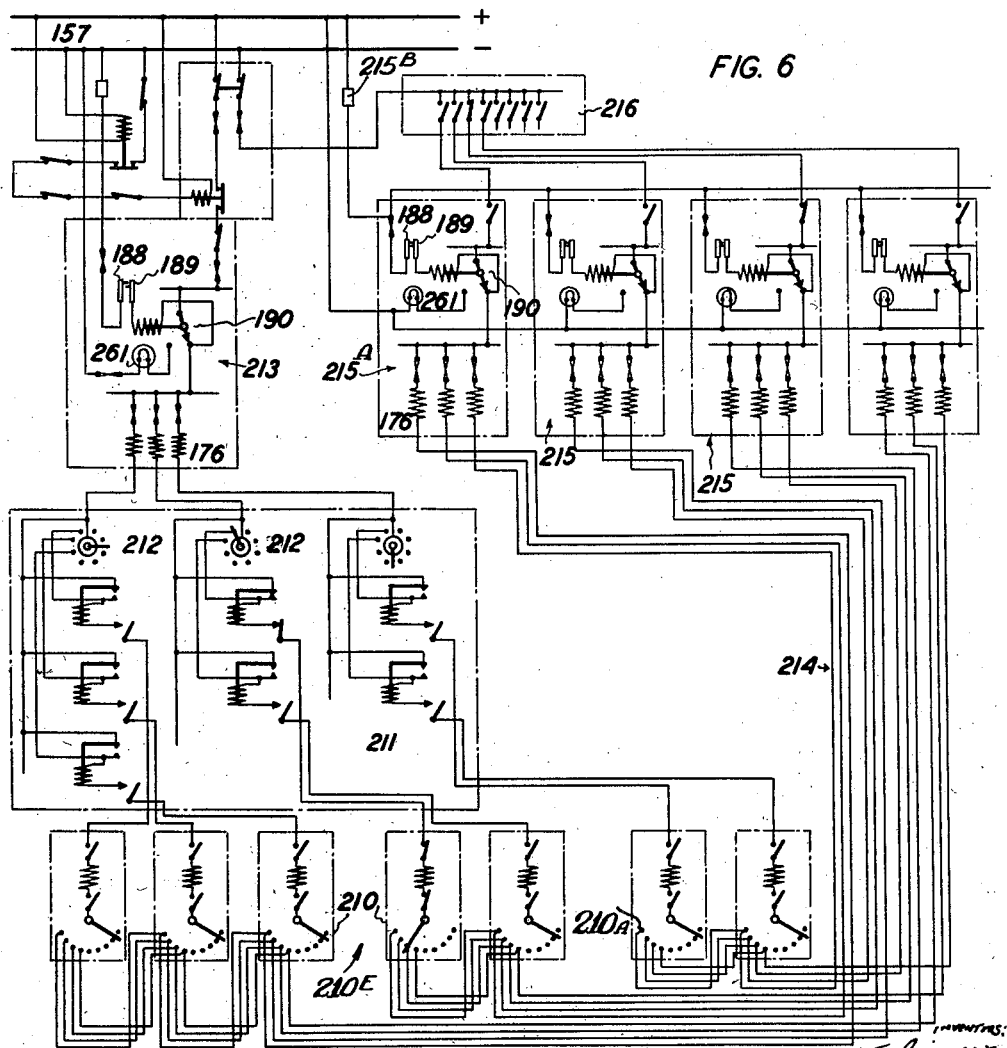
Fig. 6 is an explanatory circuit diagram of the system.

A circuit diagram is shown in Fig. 6 in which a group of ticket machines is represented at 210, each connected up electrically through a relay board 211 and rotary distributors 212 to the grand total integrator unit 213 which is connected through control switches to the supply line 157. In the unit 213, 176 represents the escapements, 261 an alarm lamp, and 190 the cut-out relay which is actuated by the slip ring contacts 188—189. The ticket machines are also connected up by the leads 214 to each of the horse total integrators 215 in which the escapements 176, relay 190 and slip ring contacts 188—189 are diagrammatically shown. One of the circuits through the ticket machine marked 210E is shown completed. The horse total integrators are connected to the return line of the main circuit 157 through switches 216, by means of which any one or more of the integrators can be cut out of the circuit.

Other switches which control the circuit through the totalizator assembly are shown in the drawings, but as they are not part of the invention they need not be described.

For example, if the relay 190 is short-circuited in the integrator marked 215A in Fig. 6, the circuit through the escapements 176 in that integrator will be opened and the circuit through the alarm lamp 261 and alarm bell 215B will be closed. As shown in Fig. 6 these escapements are electrically connected through the leads 214 with the left hand contact 210A in each of the ticket issuing machines 210. Consequently if the circuit is opened at 190 in the integrator marked 215A, the circuit through the left hand contact in every ticket issuing machine will be cut out, and no more tickets can then be issued on the horse allocated to that integrator until the fault has been rectified and the relay 190 restored. The cutting out of one integrator in this manner does not affect the operation of any other integrator in the system nor the issue of tickets in respect of any other integrator.

Figure 2:
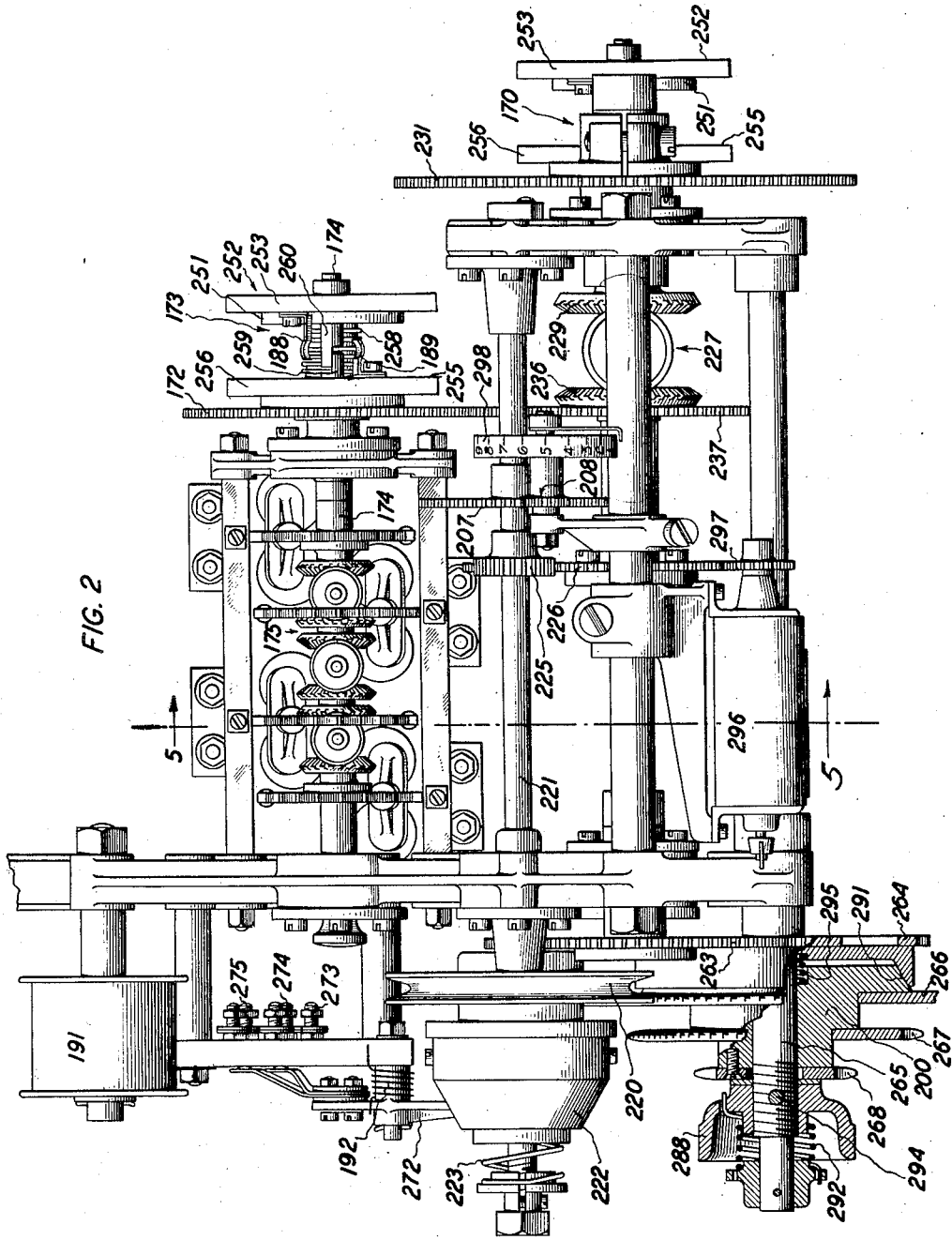
Figure 3:
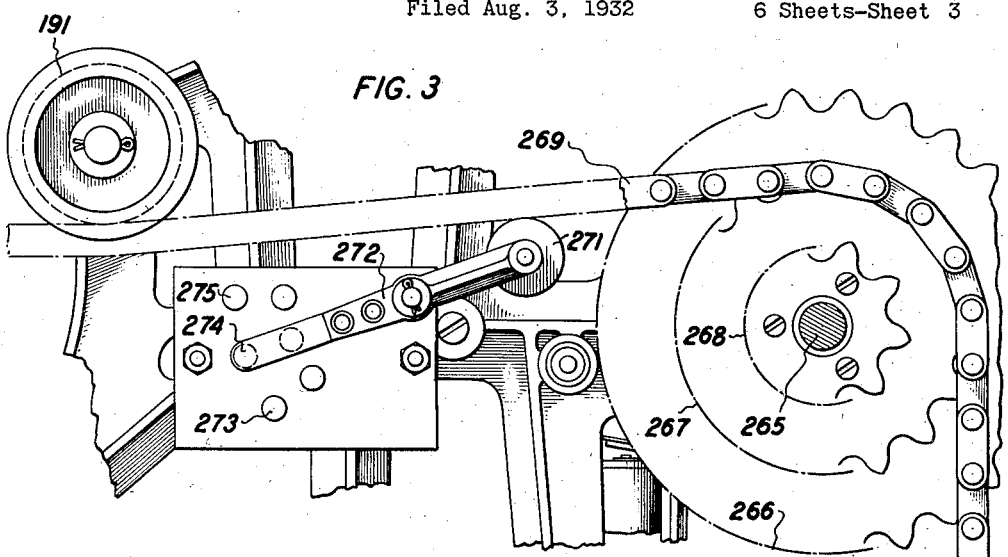
Fig. 3 is a fragmentary end elevational view of portion of the unit shown in Fig. 2. This view shows a change-over arrangement for controlling the rate of transmission from the integrator to the associated computer and indicator; this arrangement makes it practicable to construct all these mechanisms to standard dimensions and to vary their capacity by a gear change.

On the back end of the summation shaft 224 a spur wheel 263 is keyed; this spur wheel meshes with a spur wheel 264 which is keyed to a shaft 265 (Fig. 2). Three sprocket wheels 266, 267, 268 of different diameters are fixed on a clutch member 200 which is axially slidable on the shaft 265. One or other of these wheels is connected (see Fig. 3) by a chain 269 to mechanism by which an indicator is operated, or otherwise to a ratio computer and odds indicating mechanism of the type described in our co-pending United States application Serial No. 627,370. The chain 269 is under tension of a weight 270 and it is readily movable across from any one of the sprockets 266—267—268 to any other of them; when it is meshed with the sprocket 266 the range of movement applied to the chain 269 and by that chain to the indicator mechanism will be a maximum for any given number of rotations of the shaft 265, whilst when it is meshed on the sprocket 268 that movement will be a minimum. Transfer at intermediate rate is obtained when the chain is meshed on the sprocket 267.

This arrangement facilitates the utilization of the apparatus for either large or small race courses, so as to obtain maximum accuracy in the indications given by the indicator, for this reason. Where the number of tickets issued is comparatively small, the range of movement of the computing elements in the indicator apparatus would be correspondingly small, and consequently the lost motion and mechanical inaccuracies in transmission might account for a slight variation in the correctness in the figure displayed on the indicators. In such circumstances, it is desirable that the range of movement of the elements in the indicator apparatus should be magnified. This magnification is readily obtained by placing the chain 269 on the large sprocket 266 in each computer. When heavy betting is expected which would result in more extensive movements in the indicator, the transmission is geared down by placing the chains 269 on the small sprockets 268.

Figure 4:
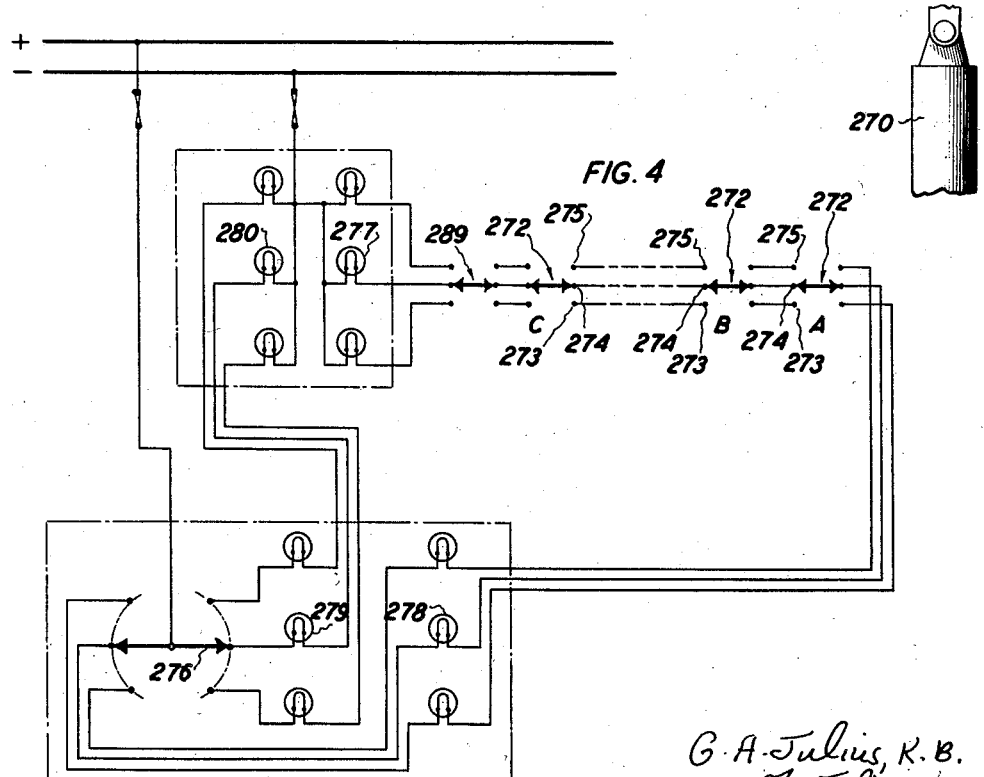
Fig. 4 is a wiring diagram explanatory of the control system by which a manager directs the setting of the various units in the totalizator machine and assures himself and assures the operators that all the operative devices are set correctly for commencement of registrations.
Figure 5:
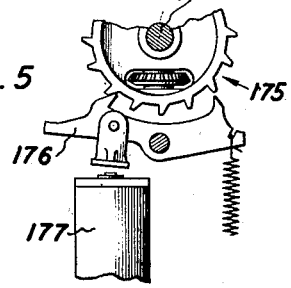
Fig. 5 is a fragmentary sectional elevation illustrating one of the escapements through which individual movements of ticket issuing machines are applied to the integrator.

The change over of the chain 269 from one sprocket 266—267—268 to the other is accompanied by an automatic change in the circuiting arrangement; this change is effected by carrying the chain 269 under an idle pulley 191 and over a jockey roller 271 which is carried on one end of a spring loaded rocking switch arm 272. A spring 192 holds the arm 272 steady, with the roller 271 in contact with the chain 269. According to the sprocket on which the chain 269 is engaged, the switch arm 272 is caused to close a circuit through one of three pairs of contacts 273, 274, 275. The switches 272 and contacts 273—274—275 in three integrators A—B—C are indicated diagrammatically in Fig. 4. When the manager, foreseeing the amount of betting which will take place on the next race, sets his control switch 276 on one or other of the circuits shown in Fig. 4, the corresponding signal lamp 279 in that circuit lights up, and with it also the signal lamp 280 in the operator's room to indicate to the operator which particular circuit is required to be operated. The operator then shifts over the chains 269 in each of the integrators thus at the same time setting the switches 272 in those integrators. This gear change necessitates a corresponding readjustment in the grand total integrator mechanism, which is shown diagrammatically positioned at 289, in Fig. 4. As all the machines are circuited in series, the response lamp 277 will not light up until the chain in every integrator has been correctly changed, and the grand total mechanism also correspondingly adjusted. When all the changes have been made and the contacts have been thus closed, the response lamp 277 in the operator's box lights up, and the response lamp 278 in the manager's room also lights up, and thus there is an assurance to both operator and manager that the circuits are complete.

In the event of a particular integrator overrunning the full capacity of the ratio computing apparatus associated with it, owing to the number of bets registered being in excess of the capacity provided for, an automatic alarm is given to the operators, whose duty it is to throw that indicator apparatus out of circuit. This is effected by means of the clutch 200 shown in Fig. 2. The operator releases this clutch by turning back a hand piece 288. A spring 295 then forces the cone faces 291 apart and thereby disconnects the drive of the shaft 265 and gear wheel 264 from the wheels 266—267—268. When the handpiece 288 is thus run back to open the clutch, it is necessary for the operator to guard against return movement by inserting a peg 294 in a check hole in the shaft 265 as a spring 292 normally winds up the handpiece 288, so as to apply pressure at the cone faces 291.

The opening of the clutch 200 thus disconnects the indicator mechanism, but it does not affect the operation of the integrator unit or the operation of the grand total mechanism, as the summation of the registrations in each integrator is registered on a "Veeder" counter 296 which is directly geared to the main summation shaft 224 through the spur wheels 297 and 226. The counter 296 does not register units; the units are displayed on a drum indicator 298 which is geared up 10:1 in relation to the counter 296 by the spur gears 207—208. For the purpose of computing payments, the figures up to the tens are taken from the counter 296 and the unit figures from the counter 298.

An integrator such as has been described is used to integrate each horse total and to actuate a ratio computer connected with it. A similar mechanism with certain modifications is used to integrate the grand total of all the horse totals.

What we claim as our invention and desire to secure by Letters Patent is:—

1. In a machine of the kind herein described for integrating operations of a plurality of ticket issuing machines, means for automatically arresting operation of said machines, said means comprising a coupling device having a driving member and a co-axial driven member, a coiled spring in tension connecting said members together and adapted to drive the driven member ahead in relation to the driving member when the issue rate is in excess of a predetermined rate, and coacting electric contacts on said members adapted to automatically open the operating circuit in which the ticket machines are included when the driven member has overrun the driving member by a predetermined portion of a rotation.

2. In a machine for integrating the operations of ticket issuing machines, a plurality of electromagnetically operable escapements, a shaft associated with said escapements, a differential gear train on said shaft, the terminal planet rotor of said train being fixed to the shaft and the other rotors fitted with escapement wheels which coact with said escapements, a helical spring connecting each outermost crown wheel with the outermost escapement, a transmission pinion rotatable on said shaft, an inner coupling member fixed to said pinion, an outer coupling member fixed to said shaft, a coiled spring connecting said coupling members and adapted to drive the outer coupling member in advance of the inner coupling member, coacting electrical contacts on said members adapted for opening the operating circuit controlling said escapements, when the issue rate is in excess of a predetermined rate, a summation shaft, spur gearing connecting said pinion with said summation shaft, and means for applying constant torsion to said summation shaft.

GEORGE ALFRED JULIUS.
AWDRY FRANCIS JULIUS.